Oct. 23, 1945.  G. R. PENNINGTON  2,387,346
CLUTCH CONTROL
Original Filed Sept. 17, 1938   2 Sheets-Sheet 1

INVENTOR
Gordon R. Pennington.
BY Harness, Lind, Patee & Harris
ATTORNEYS.

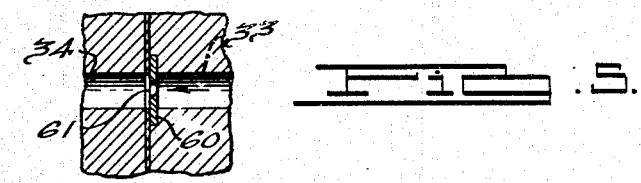
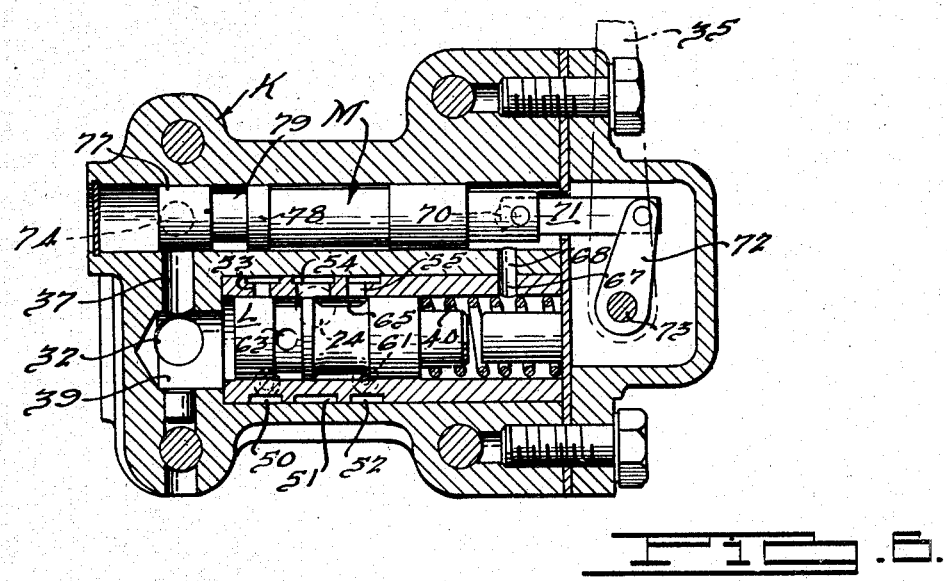
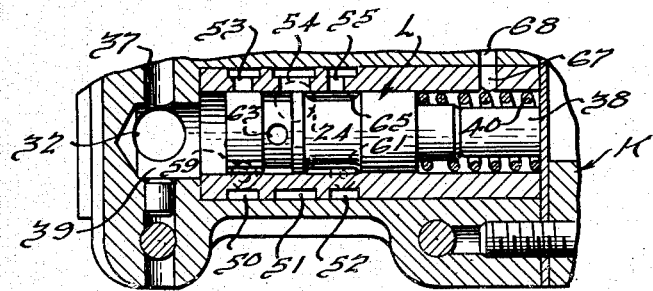

Patented Oct. 23, 1945

2,387,346

UNITED STATES PATENT OFFICE 2,387,346

CLUTCH CONTROL

Gordon R. Pennington, Bloomfield Hills, Mich., assignor to Chrysler Corporation, Highland Park, Mich., a corporation of Delaware Original application September 17, 1938, Serial No. 230,417. Divided and this application August 12, 1942, Serial No. 454,494

11 Claims. (Cl. 192—3.5)

This application is a division of my co-pending application, Serial No. 230,417, filed September 17, 1938, now Patent No. 2,134,554, patented March 23, 1943.

This invention relates to motor vehicles and refers more particularly to improvements in control means for vehicle drives.

It is an object of my invention to provide an improved pressure fluid control capable of a variety of applications to motor vehicle and other drives.

Another object is to provide an improved pressure fluid governing system operating automatically in response to predetermined desired conditions of pressure fluid delivery for effecting control of any suitable motor vehicle fluid operated device.

My pressure fluid control system may be used in conjunction with power transmissions, for example, for effecting change in the speed ratio drive of the vehicle. An application of my control system may be made to clutches, for example, whereby to control the vehicle power transmitting drive at any convenient point or points. In any event, I preferably employ some form of pressure fluid operated device associated with the power transmission, such device being operated by my pressure fluid control means.

In carrying out my invention, according to one embodiment thereof, I provide a valve adapted to be operated in response to predetermined pressure of a suitable fluid acting on the valve for controlling the delivery of the pressure fluid to the drive control device aforesaid. By pumping the fluid proportionately with a part whose speed of movement varies with the engine speed, the valve is operated in accordance with vehicle speed to provide what may be termed a "hydraulic governor."

I preferably incorporate a system of orifices associated with the fluid delivered to the valve and from the drive control device so arranged that both the operation and release of the drive control device will take place at predetermined desired vehicle driving speeds. As an auxiliary feature, my invention further includes means under control of the vehicle driver for venting the fluid acting on the valve so that the valve may return to cut off pressure fluid delivery to the control device independently of the vehicle speed.

In the more specific phases of my invention the fluid operated control valve is arranged so that it will momentarily dwell while travelling from a position of venting the drive control device to a second position of delivering the pressure fluid to the drive control device. As the valve starts its movement it closes the vent at the valve pressure chamber so that its movement once started is accelerated by a rise in the pressure of the fluid acting on the valve. At the dwell point the valve delivers fluid to the drive control device to effect initial engagement thereof while restrictively venting this device to effect a smooth or soft engagement of the control device. Then the pressure of the fluid rapidly builds up and the valve completes its movement to the aforesaid second position to fully engage the control device which is preferably frictionally engaged. Even when the control device is fully engaged it is preferably restrictively vented to enable control of its release in accordance with conditions of pressure of the fluid supplied thereto.

In power transmission systems embodying a fluid coupling, difficulty has been experienced in that when the engine idles, the inherent drive or drag effect in the fluid coupling causes the vehicle to creep and is otherwise objectionable in preventing smooth changes in the transmission mechanism. My invention provides fluid pressure means preferably operating in response to predetermined speed of the engine or input shaft for automatically controlling the drive connection between the fluid coupling and the transmission, the arrangement being such that the fluid coupling is automatically disconnected from the transmission when the engine idles and is automatically connected when the engine speeds up above its idling speed. I have also provided means under control of the operator for disconnecting the fluid coupling at any time irrespective of the engine speed.

Where restricted or metered fluid flow is used, I preferably employ an orifice presenting a sharp edge to the fluid flow in order to minimize the effect of temperature changes on the fluid medium. In general, any fluid conduit offers two classes of resistance to fluid flow therethrough, viz., one being a function of the fluid viscosity and the other having to do with the kinetic effects of the fluid.

The kinetic effects vary as the density of the liquid is changed and this is a negligible factor within the temperature range ordinarily dealt with in automotive practice. The viscosity, on the other hand, varies greatly with the temperature changes within this range and with liquids customarily used in pressure fluid systems for vehicle drive controls in general.

The sharp edge orifice has a minimum of length and surface over which the oil or other fluid is in shear and therefore the viscosity may vary without material variation in the flow through the orifice. This allows a wide selection of fluids without corresponding variation in the operating functions of the system and is important in insuring continued functioning of the system under very nearly the same conditions of vehicle or engine speed regardless of temperature variation of the fluid medium.

Further objects and features of my invention will be more apparent as this specification progresses, reference being had to the accompanying drawings in which:

Fig. 5 is a section along line 5—5 of Fig. 2.

Fig. 6 is a view of the Fig. 2 pressure fluid control showing the main control valve at its intermediate dwell point, and Fig. 7 is a fragmentary view of the Fig. 2 control showing the main control valve in "clutch engaged" position.

Figure 1:
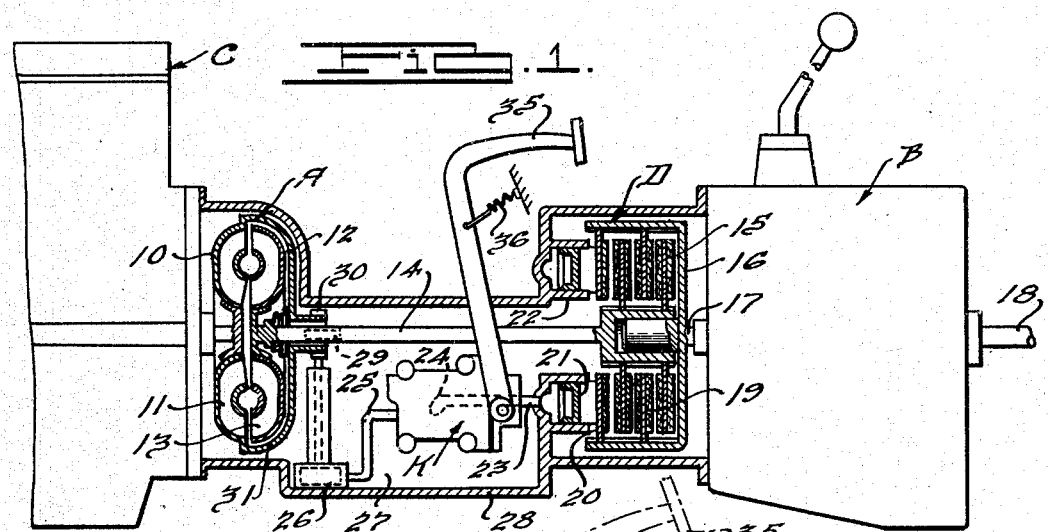
Fig. 1 is a side elevational view, somewhat diagrammatic in form, illustrating my invention applied to a clutch control, a portion of the casing being broken away to illustrate the fluid coupling and clutch.

Referring to the drawings wherein reference characters are used to designate corresponding parts referred to in the following description, as an example of my invention, I have illustrated a fluid coupling A interposed between the vehicle change-speed transmission B and the engine C. In accordance with customary practice, the drive from the coupling to the transmission is controlled by a clutch D of any suitable type, the one shown being of the multiple disc friction type.

The engine C drives the impeller member 10 of the fluid coupling A, this impeller having vanes 11 for circulating the coupling fluid outwardly by centrifugal force into a runner member 12 having similar vanes 13.

The runner member 12 is fixed to the driven shaft 14 which drives the friction plates 15 of the clutch D. This clutch has a driven member 16 carried as a part of the shaft 17 which preferably is the input shaft to any suitable type of transmission generally designated at B from whence the drive passes through the output shaft 18 for driving the ground wheels of the motor vehicle.

The clutch driven member 16 drivingly carries the driven friction members 19 and 20, the latter comprising a pressure plate movable rearwardly to pack the driving and driven clutch plates for engaging the clutch. Clutch engagement is effected by rearward movement of an annular piston 21 slidably arranged in the annular cylinder 22 having a fluid inlet 23 leading to the valving means K. The pressure fluid outlet 24 of Fig. 2 leads to the cylinder 22 of Fig. 1 while the pressure fluid delivered to the valving device K is admitted through a pipe 25 from any suitable type of pump 26 arranged in the reservoir or sump 27 of the casing structure 28.

The pump 26 is driven by a gear 29 meshing with driving gear 30 carried by the rear cover member 31 which is formed as a part of or is secured to the impeller 10 and therefore drives with the engine C.

The delivery pipe 25 of the pump 26 extends into the inlet 32 of my valving means K which is adapted to control the delivery of the pressure fluid from the pump to the cylinder 22 and also the venting of the fluid from the cylinder 22 directly back to the sump 27 for recirculation to the pump 26.

Figure 2:
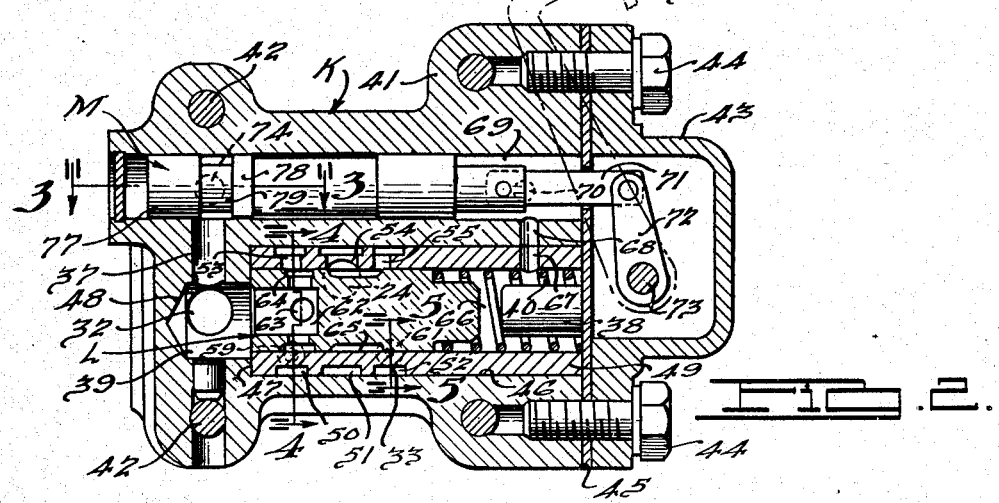
Fig. 2 is a sectional elevational view illustrating the pressure fluid control with the valving thereof in a position corresponding to the Fig. 1 position of the clutch.
Figure 3:
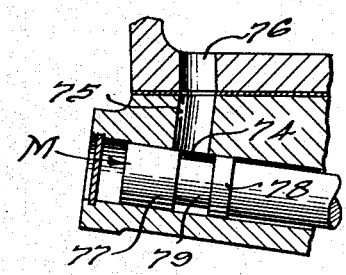
Fig. 3 is a section along this line 3—3 of Fig. 2.

Referring to Figs. 1, 2, and 5, the pressure fluid from the valving means K is delivered to the cylinder 22 by a port 24 as aforesaid, and when the valving means K is operated, as will presently be apparent, to relieve the fluid pressure at cylinder 22, then the fluid drains through a port 33 and the inwardly extending drain passage 34 into the sump 27 for recirculation to the pump 26.

In general, the valving means K comprises a main valve L adapted for automatic operation in response to a predetermined pressure of fluid delivered by the pump 26 for causing the valve to move with accelerated or snap action from a first position corresponding to the released position of clutch D, to a second position corresponding to the engaged position thereof.

I have also provided a manually operable valve M arranged in series with the main valve L, which manually operable valve is adapted for operation by a clutch pedal 35. The pedal has a return spring diagrammatically illustrated at 36 which tends to move the valve M to the right for closing off the passage 37 and maintaining the valve L in its position against the stop 38 whenever the pressure of the fluid in the chamber 39 is sufficient to move the valve L against the action of the preloaded spring 40.

Additional functions and features of novelty of my valving means K will be apparent from the following detailed description of the illustrated embodiment thereof. Referring particularly to Figs. 2 to 7, the valving means comprises a main casing 41 adapted to be secured by fasteners 42 to the casing 28. The casing 41 has a rear cover 43 secured thereto by fasteners 44, there being interposed between the cover and the casing a sealing plate 45.

The casing 41 is formed with a longitudinally extending bore 46 opening rearwardly to the plate 45 and having a front shoulder 47 and counterbored pressure chamber 48 which opens to the aforesaid delivery passage 32 leading from the exhaust pipe 25 of the pump 26. Fixed within the bore 46 is a sleeve 49 which is disposed between plate 45 and shoulder 47, this sleeve being formed with the longitudinally spaced external annular fluid conducting grooves 50, 51 and 52. The annular groove 50 is opened radially inwardly through the sleeve 49 by reason of the ports 53 and the annular groove 51 opens inwardly through ports 54. The annular groove 52 is also opened inwardly of the sleeve by one or more ports 55.

The annular groove 50 is in continuous communication with an inwardly extending relief or venting passage 56 (see Fig. 4) which is formed in the casing 41 and which communicates with a vent passage 57 formed in the casing 28 so that the fluid discharged from the passage 56 will be immediately circulated to the intake port of the pump 26.

Figure 4:
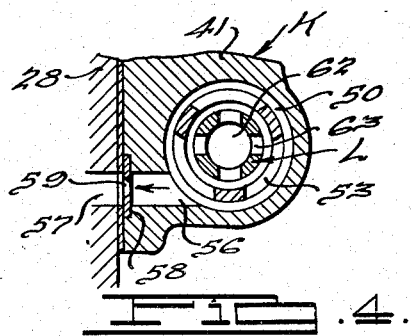
Fig. 4 is a section along line 4—4 of Fig. 2.

At some suitable point in the flow of the fluid from the annular groove 50 back to the discharge 57, I provide an orifice preferably in the form of a thin plate illustrated at 58 in Fig. 4 between casings 41 and 28. This plate has a metering opening 59 preferably in the form of a frusto-cone so as to present a sharp edge and a minimum amount of surface to the flow of fluid from passage 56 to passage 57. The orifice 59 provides a restrictive vent for the fluid in the annular groove 50 for purposes which will be presently more apparent.

The annular groove 51 is in constant communication with the aforesaid fluid delivery passage 24 of the casing 41, this passage in turn communicating with the delivery conduit 23 for supplying the pressure fluid to the cylinder 22 for operating the clutch D. The annular groove 52 is in continuous communication with the aforesaid relief passage 33 of casing 41, this passage in turn communicating with the aforesaid passage 34 of casing 28 which conducts fluid back to the sump.

Interposed between passages 33 and 34, I have positioned another thin plate orifice 60 having a sharp edge orifice opening 61 directed toward the flow of fluid from passage 33 whereby the annular groove 52 is restrictively vented along its line of fluid discharge. The orifice 61 is appreciably smaller than the aforesaid orifice 59 in order to effect certain desirable functions in the manipulation of the clutch D as will be presently described.

Slidably disposed within the sleeve 49 is the main automatic valve L, this valve being illustrated in Fig. 2 in the pressure "off" position corresponding to the disengaged position of clutch D as illustrated in Fig. 1. In this position the valve L is urged leftwardly against the shoulder 47 by a preloaded spring 40 which acts between the plate 45 and the valve. The valve L is hollow and is formed at its front end with a high pressure chamber bore 62 which is open to the aforesaid pressure chamber 39, the valve having a plurality of radially extending passages 63 which open outwardly to the annular port 64 which in the Fig. 2 position communicates with the sleeve ports 53.

Spaced rightwardly from the annular port 64 the valve L is provided with a relatively long annular port or groove 65 formed externally of the valve and, with the valve positioned as in Fig. 2, this groove 65 establishes communication between ports 54 and 55 thereby restrictively venting the cylinder 22 through the following system of passages and ports, namely, 23, 24, 65, 55, 52, 33, thence through the orifice 61 and passage 34 to the sump.

In order to limit the rearward movement of the valve L when the latter moves from the Fig. 2 position to the position thereof for supplying pressure fluid to the cylinder 22 (Fig. 7) I have provided a stop lug 38 carried by plate 45 and adapted to engage the rearward end of the valve.

The valve L is free to move to the right at any time when the fluid pressure in the chamber 48 rises sufficiently to overcome the resistance of the preloaded spring 40 provided, of course, that the manually operable valve M is in the clutch engaged position which is illustrated in Fig. 6. This valve movement may take place by reason of the chamber 66 being vented at all times through the sleeve and casing passages 67 and 68, respectively, the latter opening to the bore 69 which slidably receives the valve M. This bore is continuously open to a vent passage 70 which leads to the sump 27. The valve M is connected through a link 71 with a lever 72 fixed on the pivot shaft 73 on which the pedal 35 is carried.

The bore 69 is provided with an open vent port 74 for the passage 37 through the passages 75 and 76 so that the main valve L may be returned to the position illustrated in Fig. 2 independently of car and engine speed whenever the valve M is moved to the position shown in Fig. 2. The valve M has a pair of heads 77 and 78 which define a reduced portion 79 for connecting the passage 37 with the vent port 74 when the valve M is in the Fig. 2 position.

The spring 36 tends to keep the pedal 35 and valve M in the position illustrated in Fig. 6 wherein the vent port 74 is lapped, thus keeping the main valve L in its Fig. 7 position against the stop 38 whenever the pressure of the fluid in chamber 39 is sufficient to move the valve against the action of the preloaded spring 40.

In the operation of the embodiment illustrated, let us assume that the vehicle is at rest. If desired, the clutch pedal 35 may be depressed in starting the engine or, of course, the engine may be set with the transmission B set for neutral so that the car will not start on starting the engine. When the engine is started with the pedal 35 depressed, the transmission B may be manipulated to any desired drive from shaft 17 to shaft 18 and the engine accelerated in the usual manner as the clutch pedal 35 is released. As the speed of the engine increases above its idling point, the main valve L will move to the right and will cause the fluid pressure to be delivered from the supply pipe 25 and pressure port 32 to the chamber 39, thence through bore 62, port 63, port 54 and groove 51 into passage 24 for engaging the clutch D and establishing a drive between shafts 14 and 17. Fig. 7 shows the position of the valve parts when clutch D is engaged. During this time the fluid coupling A operates in the customary manner to decrease the slip therethrough as the speed of the engine increases.

When it is desired to manipulate the transmission B for changing the gear ratios therein, the pedal 35 may be depressed to vent the pressure chamber 39 through the port 74 and passages 75 and 76, thereby causing the clutch D to disengage for the purpose of shifting gears in the transmission B.

When the vehicle is brought to a temporary stop as when the car approaches a red traffic signal for example, the transmission may be left in gear if desired and as the brakes are applied to the vehicle and the engine speed is brought down approximately to its idling condition, the pressure of the fluid delivered by the pump 26 will have diminished sufficiently to enable the spring 40 to return the valve L to the Fig. 2 position, thereby venting the cylinder 22 for causing the clutch D to disengage. In this manner, the engine C is released from the output shaft 18 and the valving device K acts as an automatic control on the drive in response to idling of the engine. When the traffic light shows green, then the driver need only to accelerate the engine C causing a corresponding increase in pressure fluid delivered from the pump 26 to the pressure chamber 39 thereby causing the valve L to move to the right and admit the pressure fluid to the cylinder 22 for engaging the clutch D preferably through the cushioning means afforded by the restrictive vent at the orifice 61 which functions in a manner to be more fully explained.

When the throttle is opened to speed up the engine, the valve L moves to the right until it assumes the position illustrated in Fig. 6 which might be termed an intermediate dwell point of momentary duration during movement of the valve from the clutch disengaged position in Fig. 2 to the engaged position of Fig. 7. At this point the valve has moved to close off the sleeve ports 53 to shut off the flow through the restrictive vent and orifice 59 and the annular valve groove 64 is slightly open to the sleeve ports 54 for supplying the pressure fluid from the chamber 39 to the cylinder 22 through port 24.

As this takes place the valve momentarily hesitates at this point because of the pressure drop in the chamber 39 due to opening of the pressure chamber to the supply line leading to the cylinder 22. At the same time the valve groove 65 is open through sleeve ports 55 to the restrictive vent through orifice 61 so that a portion of the fluid flow is vented through this orifice during the time that the supply line to the motor 22 is filling and effecting engagement of the clutch D against the resistance of the regular clutch disengagement springs (not shown).

I have found that the pressure moves the valve L as aforesaid and good results are obtained by roughly a third of the oil delivered at the valve groove 65 passing through the orifice 61 which, of course, leaves the bulk of the oil for delivery to the cylinder 22 for applying the clutch. Thus the orifice 61 (which is preferably of less diameter than the orifice 59) functions to prevent a water hammering effect while the line is filling to the motor 22 and I have thus provided a distinct cushioning effect for engaging the clutch D.

As soon as the clutch discs are engaged with each other at the clutch D, then at this instant the pressure in the delivery passage 24 rises rapidly and the valve L is thereby pulled further to the right as a result of the increased pressure resulting in an increase of the flow of oil through the orifice 61 which further cushions the final stages of the engagement of the clutch D and results in what may be termed a dashpot action of the engagement of the clutch. At this time the valve L is moved to the Fig. 7 position from which it will be noted that the orifice 61 continues to restrictively vent the passage 24 while the ports 53 continue to be closed by the valve L.

By preference, the length of the annular groove 64 is about equal to or slightly less than the longitudinal distance between the sleeve ports 53 and 54 to facilitate rapid movement of the valve L to the right to attain a more positive snap action in the valve movement. When the valve L has been moved to the Fig. 7 position, it will be noted that this movement is limited by the stop 38 and that the chamber 66 is always open to the drain passage 70 through passages 67 or 68.

The orifice 61 is appreciably smaller than the orifice 59 so that if the car speed is sufficient to overcome the flow through the orifice 59 and thereby move the valve L to the right, then it will be more than sufficient to maintain the valve L to the right in the Fig. 7 position and thereby prevent a hunting tendency of the valve. Furthermore, the orifice 59 controls the speed at which the valve will automatically return to the Fig. 2 position in response to a drop in pressure in the chamber 39 for effecting disengagement of clutch D. This will take place preferably at a lower engine speed than that at which the clutch will engage and is preferably in the neighborhood of 400 R. P. M.

I preferably employ a preloaded type of spring 40 as this has important commercial aspects in keeping down the distance of travel of the valve L and also provides better automatic snap action of the valve when it starts to move.

I preferably employ a sharp edge orifice conduit at 59 and 61 in order to minimize the effect of temperature changes on the function of my pressure fluid controlling mechanism. Any oil passage will offer two kinds of resistance to the fluid flow, one of which is due to the viscosity of the oil and the other has to do with the kinetic effects of the oil flow. The viscosity factor varies greatly with the temperature changes when the usual fluids employed in transmission control are used. The kinetic effects on the other hand vary only as the density of the liquid is changed and this is such a small factor as to be negligible within the limits of temperature variation ordinarily dealt with and experienced with motor vehicle operation.

A sharp edge orifice has a minimum of length and surface over which the oil is in shear and therefore presents a minimum of variation due to the viscosity effect and thus this type of orifice presents a minimum total variation allowing a wide selection of fluids without corresponding variation in the operation of the device. The sharp edge orifice therefore carries the desirable effects substantially to the point where the mechanism controlled by the valving device K functions just the same in summer as in winter and for all practical purposes the same regardless of the density of the liquid employed, thereby making my control mechanism especially suited for commercial use. By substituting other sized orifices for those illustrated, I can, of course, obtain a wide variation in the functions of the mechanism as will be readily understood. The desired effects can be approached by the use of a thin plate orifice although I prefer to additionally provide the sharp edge of orifice opening in order to still further render the apparatus free from temperature variations and changing density in the oil medium.

Various other applications of my improved valving device will be readily apparent from the foregoing illustrative embodiments and also various changes in the details of construction and mode of operation may be apparent from my description and it is not my intention to limit my invention apart from the scope afforded by the appended claims within the broader aspects of my invention.

I claim:

1. In a motor vehicle power system, a driving shaft, a change-speed transmission, a fluid coupling driven by the driving shaft, means releasably drivingly connecting said fluid coupling with said transmission including a pressure fluid operated drive control device, means operating in response to predetermined speed of said driving shaft for delivering fluid under pressure to said device and for venting said device when the speed of said driving shaft falls below said predetermined speed thereby to release said transmission from said fluid coupling, and means operable at the will of the vehicle driver for venting said device independently of the operation of the first said venting means.

2. In a motor vehicle power transmission, a driving shaft, a driven shaft, a fluid coupling driven by the driving shaft, means releasably drivingly connecting said fluid coupling with said driven shaft including a pressure fluid operated drive control device, a source of fluid supply, a pump for delivering the fluid under pressure from said supply, means for driving said pump at a speed proportionate to said driving shaft for delivering the fluid under pressure varying with the speed of said driving shaft, a valve adapted for movement from a first position of venting said device to a second position for establishing communication between the pressure fluid delivered by the pump and said device for causing operation of said device, a spring yieldingly urging said valve to its said first position, means under control of said valve for venting said device to afford release thereof when said valve is in its said first position, means for conducting the pressure fluid from said pump to said valve for causing movement of said valve to its said second position in opposition to said spring when the conducted fluid reaches a predetermined pressure, and means under control of said valve for conducting the pressure fluid delivered by said pump to said device when said valve is moved to its said second position.

3. In a motor vehicle power system incorporating an engine arranged to drive a transmission through the intermediary of a fluid coupling, means for releasing the transmission from the fluid coupling drag at engine idling speed comprising, means for releasably drivingly connecting said fluid coupling with the transmission including a pressure fluid operated drive control device, and means operating to conduct fluid under pressure to said device when said engine is operated above its idling speed and to vent said device at lesser speeds.

4. In a power control mechanism of the character described having a clutch device comprising relatively rotatable frictionally engageable elements for controlling drive transmission between driving and driven shafts of a motor vehicle, fluid control means for said clutch comprising, a source of fluid supply, a pump for delivering the fluid under pressure from said supply, means for driving said pump at a speed proportionate to one of said shafts for delivering the fluid under pressure varying with the speed of this shaft, a valve adapted for movement from a first position of venting said device thereby to accommodate relative disengagement of said elements, to a second position for establishing communication between the pressure fluid delivered by the pump and said device for causing relative engagement of said elements, a spring yieldingly urging said valve to its said first position, means under control of said valve for venting said device to accommodate relative disengagement of said elements when said valve is in its said first position, means for conducting the pressure fluid from said pump to said valve for causing movement of said valve to its said second position in opposition to said spring when the conducted fluid reaches a predetermined pressure, means under control of said valve for conducting the pressure fluid delivered by said pump to said device when said valve is moved to its said second position, and means for restrictively venting the last said fluid conducting means so arranged as to cushion said relative engagement of said elements when said valve is moved to its said second position.

5. In a motor vehicle, in combination, an engine; a propelling shaft; a clutch for disconnecting the drive of the engine from said propelling shaft; a fluid pressure motor for controlling said clutch; means for controlling said motor comprising a pump driven by said engine; a pressure chamber open to said pump; a pressure port in said chamber connected with said motor; a valve in said chamber adapted for movement from a first position corresponding to the disengaged position of said clutch to a second position corresponding to the engaged position of said clutch; a preloaded spring for urging said valve to said first position; a restriction vent port in said chamber for venting the same when said valve is in said first position; a second restricted vent port in said chamber for venting the same when said valve is in said second position.

6. In a motor vehicle in combination, an engine; a propelling shaft; a clutch for disconnecting the drive of the engine from said propelling shaft; a fluid pressure motor for controlling said clutch; means for controlling said motor comprising a pump driven by said engine; a pressure chamber open to said pump; a pressure port in said chamber connected with said motor; a valve in said chamber adapted for movement from a first position corresponding to the disengaged position of said clutch to a second position corresponding to the engaged position of said clutch; a preloaded spring for urging said valve to said first position; a restricted vent port in said chamber for venting the same when said valve is in said first position; a second restricted vent port in said chamber for venting the same when said valve is in said second position; the orifice restriction of said second vent port being of smaller diameter than the orifice restriction of said first vent port.

7. In a motor vehicle, in combination, an engine; a propelling shaft; a clutch for disconnecting the drive of the engine from said propelling shaft; a fluid pressure motor for controlling said clutch; means for controlling said motor comprising a pump driven by said engine; a pressure chamber open to said pump; a pressure port in said chamber connected with said motor; a valve in said chamber adapted for movement from a first position corresponding to the disengaged position of said clutch to a second position corresponding to the engaged position of said clutch; a preloaded spring for urging said valve to said first position; a restriction vent port in said chamber for venting the same when said valve is in said first position; a second restricted vent port in said chamber for venting the same when said valve is in said second position; said valve being constructed and arranged such that increase in fluid pressure in said chamber caused by increase in R. P. M. of said engine will effect movement of said valve toward said second position to thereby close said first vent port and open said pressure port, and a passage in said valve for opening said second vent port simultaneously with said pressure port.

8. In a motor vehicle, in combination, an engine; a propelling shaft; a clutch for disconnecting the drive of the engine from said propelling shaft; a fluid pressure motor for controlling said clutch; means for controlling said motor comprising a pump driven by said engine; a pressure chamber open to said pump; a pressure port in said chamber connected with said motor; a valve in said chamber adapted for movement from a first position corresponding to the disengaged position of said clutch to a second position corresponding to the engaged position of said clutch; a preloaded spring for urging said valve to said first position; a restriction vent port in said chamber for venting the same when said valve is in said first position; a second restricted vent port in said chamber for venting the same when said valve is in said second position; and manual means operable independently of said valve for venting said chamber.

9. In a motor vehicle, in combination, an engine; a propelling shaft; a clutch for disconnecting the drive of the engine from said propelling shaft; a fluid pressure motor for controlling said clutch; means for controlling said motor comprising a pump driven by said engine; a pressure chamber open to said pump; a pressure port in said chamber connected with said motor; a valve in said chamber adapted for movement from a first position corresponding to the disengaged position of said clutch to a second position corresponding to the engaged position of said clutch; a preloaded spring for urging said valve to said first position; a restriction vent port in said chamber for venting the same when said valve is in said first position; a second restricted vent port in said chamber for venting the same when said valve is in said second position; said valve being constructed and arranged such that increase in fluid pressure in said chamber caused by increase in R. P. M. of said engine will effect movement of said valve toward said second position to thereby close said first vent port and open said pressure port, and a passage in said valve for opening said second vent port simultaneously with said pressure port; and manual means operable independently of said valve for venting said chamber.

10. In combination with a motor vehicle clutch having fluid pressure control, a valving device for controlling operation of the clutch comprising a pressure chamber; a pump driven by the vehicle engine for supplying said chamber; a valve in said chamber adapted for movement by the pressure of the fluid in said chamber from a "clutch disengaged" position to a "clutch engaged" position; a preloaded spring for urging said valve to "clutch disengaged" position; a restricted vent port open to said chamber only when said valve is in "clutch disengaged" position; a second vent port having greater restriction than the aforesaid vent port open to said chamber when said valve is in said "clutch engaged" position; a pressure port open to said chamber when said valve is in "clutch engaged" position; and means for opening said pressure port and said second vent port simultaneously before said valve has reached the end of its stroke to thereby slow the movement of said valve driving part of its stroke and effect smooth and gradual engagement of said clutch.

11. In a motor vehicle power system, an engine, a fluid coupling having a driving member and a driven member, means drivingly connecting the engine and the driving member of the fluid coupling, a change-speed transmission, means providing a releasable driving connection of the transmission with the driven member of the fluid coupling, and means responsive to engine speed for rendering ineffective the driving connection between the transmission and the driven member of the fluid coupling to release the transmission from fluid coupling drag at engine idling speed.

GORDON R. PENNINGTON.